Patented July 23, 1946

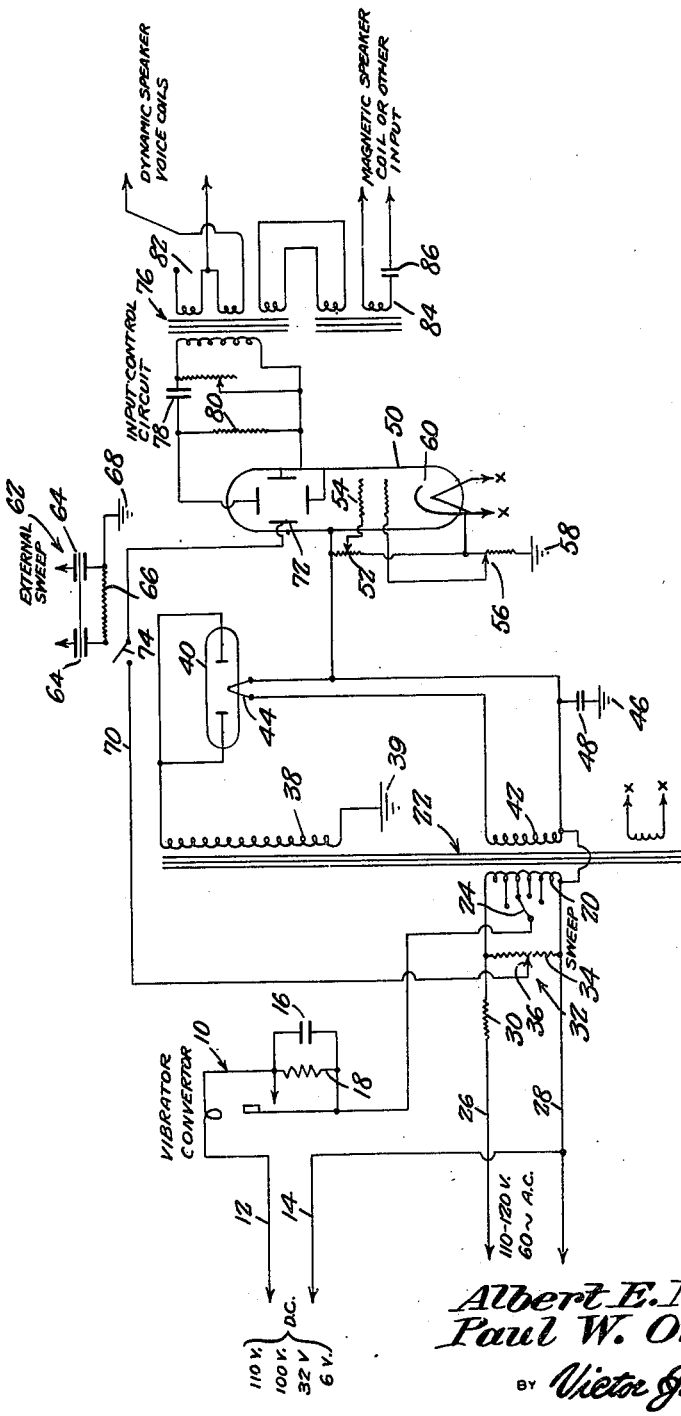

2,404,738

UNITED STATES PATENT OFFICE 2,404,738

OSCILLOGRAPH

Albert E. Moulin, Jr., and Paul W. Orchard, Jr., New Orleans, La.

Application October 22, 1942, Serial No. 463,016

6 Claims. (Cl. 315—28)

Our invention relates to electric circuits, and has among its objects and advantages the provision of an oscillograph designed for operation on alternating or direct current, wherein a vibrator is employed for converting battery or direct current into alternating current pulsations, and in which the oscillograph may be employed for testing tone qualities of amplifiers, radios and the like, testing strength of materials and mechanical vibrations of all kinds, testing all types of tubes, coils, interference noises, in addition to its efficient service in various other fields.

The figure is a diagrammatic illustration of our oscillograph circuit.

In the embodiment of the invention selected for illustration, we make use of a vibrator circuit 10 in association with direct current lines 12 and 14, which may connect with a battery or direct current supply lines. The vibrator 10 includes a .02 microfarad 1,000 volt condenser 16 shunted by a 5,000 ohm 10 watt resistance 18, which are interposed in the line 12. The primary winding 20 of a power transformer 22 is tapped for input voltages of 6, 32, 100 and 110, and is provided with a switch 24 for changing from one voltage to another.

110–120 volt 60 cycle alternating current lines 26 and 28 connect with the primary winding, and a 30 watt 100 ohm resistance 30 is interposed in the line 26. A sweep control 32 includes a .5 megohm resistance 34 and a wiper contact 36, the resistance being shunted across the input winding of the power transformer, with one terminal of the input winding connected to the B supply lead.

The high voltage winding 38 of the power transformer has one terminal grounded at 39 to the chassis and its other terminal connected with the parallel plates of a rectifier tube of the 80 type so that it may be operated as a halfwave rectifier. There is a voltage of 350 in the high voltage winding 38. This is sufficient to produce a good cathode beam focus. The filament winding 42 of the power transformer 22 connects with the filament 44 of the tube 40 and is grounded at 46 and connected with a .25 microfarad condenser 48 employed to filter the B+ voltage.

The voltage from the filament 44 is applied to the shell of a 913 cathode ray tube 50, which is connected to the deflecting plates. While there may be a slight disadvantage in having a high charge on the shell of this tube, the beam focus is more accurate than if a negative or no voltage were applied. A .5 megohm potentiometer 52 connects with the screen grid 54 of the cathode ray tube. The cathode voltage is controlled by a 32,000 ohm potentiometer 56 grounded at 58. Thus the grid bias is obtained from the potentiometer 56 connected from the cathode 60 of the tube to the ground as (—) voltage increases when the center arm approaches the cathode point of the control (the ray becoming and finally reaching invisibility). When the arm approaches the ground position, the converse occurs. An external sweep circuit 62 is employed, which includes two .001 microfarad coupling condensers 64 and a 5 megohm resistance 66 grounded at 68. The wiper 36 connects with a line 70 leading to the plate 72 of the cathode ray tube and a switch 74 is interposed in this line.

The vertical sweep impulses are fed to the low impedance winding of an impedance matching transformer 76, are then transferred to the high resistance winding and are passed through a .00045 microfarad blocking condenser 78 to the vertical deflecting plates. The necessary potential is supplied by a 5 megohm resistance 80 connected from the B+ lead to the deflector plate. This high resistance in the deflector circuit makes the ray much more sensitive to signal changes.

The transformer winding 82 may be connected with the voice coils of a dynamic speaker, while the winding 84 may be connected with a magnetic speaker coil or other input, a .1 microfarad bypass condenser 86 being employed as a blocking condenser in order to prevent the transformer windings from shunting magnetic speaker windings. The sweep voltage is supplied from the control 32 shunted across the input winding, with one end of the input winding connected to the B+ lead so that the control may cancel any desired amount of sweep effect. When no sweep voltage is applied or the wiper is in its minimum position, it cancels all horizontal sweep effect. The cathode ray will appear as a stationary point of light on the screen.

The vertical signal amplitude is controlled by a two point control shunted high resistance windding of the coupling transformer 76. The advantages in using an impedance matching transformer reside in the fact that the oscillograph may be clipped to any radio frequency receiver or superheterodyne circuit without soldering or changing the circuit of the set. Since the transformer 76 is connected to the voice coil leads of the speaker, the output of the device under test serves as a vertical amplifier. The removal of the vertical amplifying tube increases the simplicity and decreases the operating difficulties.

Although the transformer 76 is the simplest device, other inductance, capacitance, impedance, resistance, electronic coupling, special filtering devices and/or combinations of the above can be substituted for said transformer 76. When used with a magnetic speaker circuit, or intercircuit connection, high resistance input provides considerable induction amplification.

The vibrator converter circuit is of relatively simple construction and includes but one point thereby causing less wear on the vibrator parts. It has the added feature of more current delivery with less arcing and is less difficult to maintain in good operating condition than are vibrators of the multipoint type.

With respect to the power transformer 22, a special sweep voltage winding may be employed instead of the type shown, although the type illustrated is relatively simple in design and operation. A vibrator of the self rectifying type may be employed, in which case the tube 40 may be eliminated. Should a glass type tube 50 be employed, the two deflector plates which are connected to the metal shell should be connected together and then to the B+ voltage supply.

Without further elaboration, the foregoing will so fully explain our invention, that others may, by applying current knowledge, readily adapt the same for use under various conditions of service.

We claim:

1. In an oscillograph circuit, the combination of an impedance matching transformer, a cathode ray tube having a cathode, heater element therefor, grid and deflecting plates, a control circuit for the input to said cathode ray tube from said transformer, a rectifier tube having plates connected in parallel and a filament connected with the grid and heater-cathode elements of said cathode ray tube, a power transformer having a high voltage secondary winding connected with the plates of said rectifier tube and a secondary winding connected with the filament thereof, means for selectively supplying alternating current or converted direct current to the primary winding of the transformer, and a sweep voltage control shunted across the primary winding of said power transformer and leading to a deflecting plate of the cathode ray tube to cancel out any desired amount of sweep effect.

2. In an oscillograph circuit, the combination of an impedance matching transformer, a cathode ray tube having a cathode, heater element therefor, grid and deflecting plates, a control circuit for the input to said cathode ray tube from said transformer, a rectifier tube having plates connected in parallel and a filament connected with the grid and heater-cathode elements of said cathode ray tube, a power transformer having a high voltage secondary winding connected with the plates of said rectifier tube and a second secondary winding connected with the filament thereof, means for selectively supplying the alternating current or converted direct current to the primary winding of the transformer, a sweep voltage control shunted across the primary winding of said power transformer and leading to a deflecting plate of the cathode ray tube to cancel out any desired amount of sweep effect, and a connection between the primary winding of said power transformer and the filament of said rectifier tube.

3. In an oscillograph circuit, the combination of an impedance matching transformer, a cathode ray tube having a cathode, heater element therefor, grid and deflecting plates, a control circuit for the input to said cathode ray tube from said transformer, a rectifier tube having plates connected in parallel and a filament connected with the grid and heater-cathode elements of said cathode ray tube, a power transformer having a high voltage secondary winding connected with the plates of said rectifier tube, means for selectively supplying alternating current or converted direct current to the primary winding of the tarnsformer, a sweep voltage control shunted across the primary winding of said power transformer and leading to a deflecting plate of the cathode ray tube to cancel out any desired amount of sweep effect, a connection between the primary winding of said power transformer and the filament of said rectifier tube, and a potentiometer controlling the biasing voltage applied to the grid of the cathode ray tube.

4. In an oscillograph circuit, the combination of an impedance matching transformer, a cathode ray tube having a cathode, heater element therefor, grid and deflecting plates, a control circuit for the input to said cathode ray tube from said transformer, a rectifier tube having plates connected in parallel and a filament connected with the grid and heater-cathode elements of said cathode ray tube, a power transformer having a high voltage secondary winding connected with the plates of said rectifier tube, means for selectively supplying alternating current or converted direct current to the primary winding of the transformer, a sweep voltage control shunted across the primary winding of said power transformer and leading to a deflecting plate of the cathode ray tube to cancel out any desired amount of sweep effect, a connection between the primary winding of said power transformer and the filament of said rectifier tube, a potentiometer controlling the biasing voltage applied to the grid of the cathode ray tube, and a second potentiometer controlling the voltage applied to the cathode of said cathode ray tube and connected from the cathode to ground.

5. In an oscillograph circuit, the combination of an impedance matching transformer, a cathode ray tube having a cathode, heater element therefor, grid and deflecting plates, a control circuit for the input to said cathode ray tube from said transformer, a rectifier tube having plates connected in parallel and a filament connected with the grid and heated-cathode elements of said cathode ray tube, a power transformer having a high voltage secondary winding connected with the plates of said rectifier tube and a second secondary winding connected with the filament thereof, means for selectively supplying alternating current or converted direct current to the primary winding of the transformer, a sweep voltage control shunted across the primary winding of said power transformer and leading to a deflecting plate of the cathode ray tube to cancel out any desired amount of sweep effect, a connection between the primary winding of said power transformer and the filament circuit of said rectifier tube, a potentiometer controlling the biasing voltage applied to the grid of the cathode ray tube, a second potentiometer supplying a voltage to the cathode of the cathode ray tube and connected from the cathode to ground, and a filter condenser connected from the filament of the rectifier tube to ground.

6. In an oscillograph circuit, the combination of an impedance matching transformer, a cathode ray tube having a cathode, heater element therefor, grid and deflecting plate, a control circuit for the input to said cathode ray tube from said transformer, a rectifier tube having plates connected in parallel and a filament connected with the cathode ray tube, a power transformer having a high voltage secondary winding connected with the plates of said rectifier tube, means for selectively supplying alternating current or converted direct current to the primary winding of the transformer, a sweep voltage control shunted across the primary winding of said power transformer and leading to a deflecting plate of the cathode ray tube to cancel out any desired amount of sweep effect, a connection between the primary winding of said power transformer and the filament circuit of said rectifier tube, a potentiometer controlling the biasing voltage applied to the grid of the cathode ray tube, a second potentiometer supplying a voltage to the cathode of the cathode ray tube and connected from the cathode to ground, and a filter condenser connected from the filament of the rectifier tube to ground, said input control circuit including a blocking condenser.

ALBERT E. MOULIN, Jr.
PAUL W. ORCHARD, Jr.